United States Patent [19]

Yin et al.

[11] Patent Number: 4,636,227
[45] Date of Patent: Jan. 13, 1987

[54] MONITORING BY ADSORPTION

[75] Inventors: Candido C. Yin, Llanbradoch; Graham L. Matthews, Cardiff, both of United Kingdom

[73] Assignee: Coal Industry (Patents) Limited, London, England

[21] Appl. No.: 682,174

[22] Filed: Dec. 17, 1984

[30] Foreign Application Priority Data

Jan. 27, 1984 [GB] United Kingdom ................. 8400258

[51] Int. Cl.4 ............................................. B01D 53/04
[52] U.S. Cl. ......................................... 55/74; 55/197; 55/270; 55/387; 422/88; 436/178
[58] Field of Search ..................... 55/34, 67, 197, 270, 55/390, 387, 74; 73/863.12, 863.21; 422/83, 86, 88; 436/178, 181

[56] References Cited

U.S. PATENT DOCUMENTS

| 1,604,649 | 10/1926 | Manning | 210/786 |
| 3,684,705 | 8/1972 | Matsumoto | 210/198.2 |
| 4,003,257 | 1/1977 | Fletcher | 436/178 X |
| 4,429,049 | 1/1984 | Rogers et al. | 436/178 X |
| 4,481,297 | 11/1984 | Zucal et al. | 436/181 |

Primary Examiner—Charles Hart
Attorney, Agent, or Firm—James C. Wray

[57] ABSTRACT

A passive monitor for very low concentrations of organic contaminant vapors in an atmosphere uses a holder having a first sampling chamber exposable to the atmosphere and a second desorption chamber and a charge of adsorbent. In one position of the holder, the adsorbent occupies the sampling chamber and upon changing position, the adsorbent occupies the desorption chamber.

10 Claims, 2 Drawing Figures

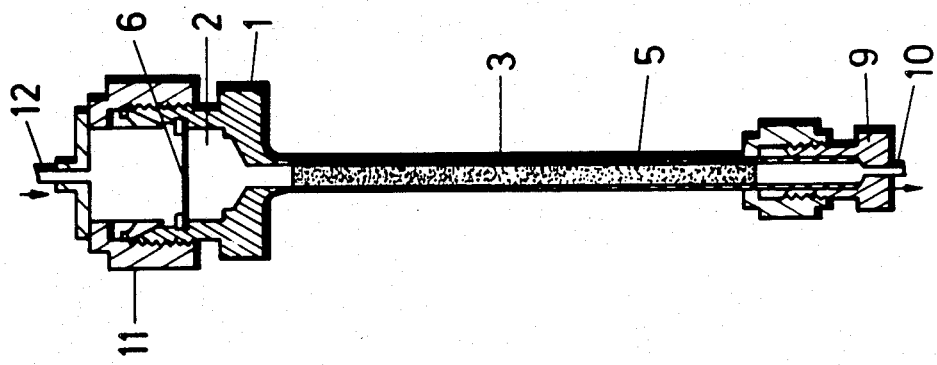
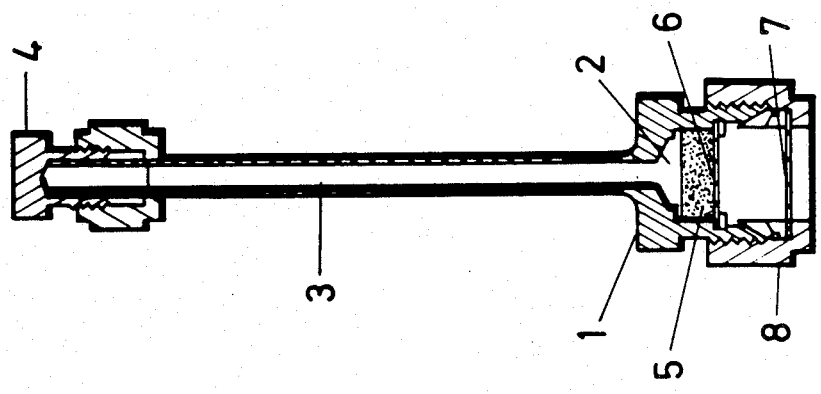

MONITORING BY ADSORPTION

This invention concerns improvements in monitoring, more especially it concerns improvements in passive monitoring of organic vapours present in an atmosphere.

It is known to sample atmospheres in the workplace to detect contaminants. The two basis systems are active and passive systems; the active systems drawing atmosphere into an apparatus by use of a pump and then either continuously monitoring, for example by infrared analysis, or by absorbing/adsorbing the contaminent on a material which can after a known time be treated to release the contaminants for analysis. A passive system operates without the use of a pump and generally operates by diffusion of the atmosphere and the collection of the contaminant on a suitable material. There are successful commercially available sampling systems of both types but we do not believe that any are capable of sampling accurately atmospheres containing very low quantities of organic vapours of the order of $ppm \times 10^{-3}$. For example, the NIOSH Charcoal Absorption Tubes with Sipin Personal Sampling Pump is widely used in the USA, UK and elsewhere as an accurate method determination of, inter alia, Benzene, Toluene and Xylenes (BTX) in the workplace. However, it is not recommended that the NIOSH system should be used for concentrations below 0.1 ppm. Replacing the charcoal tubes with vapour adsorption tubes utilising a polymeric adsorbent material, Tenax GC, improves the lower limit of determination to about $3 \times 10^{-3}$ ppm. but the requirement for constant supervision of each sampling point, rules out the simultaneous monitoring of a widespread area, for example the environment of a coking works.

Passive monitors or dosimeters depend upon the diffusion of the individual organic vapours, and the physical construction of the monitor. Several passive monitors are on the market and offer, at a relatively low cost, the possibility of use in large numbers without requiring labour-intensive supervision. The majority of these use a charcoal-impregnated element or charcoal granules and are incapable for various reasons, including often a high level of contamination of the adsorbent, of accurately measuring very low levels of air-borne contaminents. Commerical passive monitors using polymeric adsorbents also exist and while these do allow an improved performance over charcoal types, they still do not offer accuracy in the $ppm \times 10^{-3}$ range.

The present invention provides a novel passive monitor capable of accuracy in measuring $ppm \times 10^{-3}$ concentrations of organic vapours in an atmosphere comprising a charge of adsorbent and an adsorbent holder having a first sampling chamber and a second desorption chamber interconnected and arranged such that the charge of adsorbent may be positioned in the first chamber wherein it is exposed to the atmosphere and adsorbs any organic contaminants and at the end of a predetermined sampling time may be transferred without handling to the second chamber in which the adsorbent may be treated to desorb the organic contaminants so that they are removed from the holder for analysis, the first chamber having a larger cross-sectional area than the second chamber.

The preferred adsorbent is a polymeric adsorbent but may be any adsorbent capable of adsorbing organic vapours at the required concentrations in air and desorbing essentially all adsorbed vapours without requiring treatment by a liquid solvent. Preferably, desorption is accomplished by heating, using a stream of clean gas to carry desorbed material out of the holder for analysis. The method or analysis is not critical provided it offers sufficient accuracy at the concentration levels met with, and is conveniently a chromatographic method.

Conveniently, the adsorbent holder comprises two cylinders, one having a relatively large diameter to length ratio and which forms the first chamber and the other having a relatively low diameter to length ratio which forms the second chamber. Preferably, simple inversion causes the adsorbent to flow under gravity from one chamber to the other, and simple coaxial connection of the cylinders provides a straightforward and effective construction. The adsorbent holder must provide access for the atmosphere to be sampled and yet prevent the loss of adsorbent; similarly the adsorbent must not be lost when the desorption takes place. Conveniently the adsorbent is retained in place by a fine mesh which does not restrict diffusion of the atmosphere to the adsorbent. Preferably the adsorbent holder is provided with connection means whereby a gas supply line may be connected and a connection means whereby the gas carrying desorbed contaminant may flow to means for analysis.

The invention will now be described with reference to the accompanying drawings in which:

FIG. 1 shows a cross-section of a monitor according to the invention ready to sample an atmosphere, and FIG. 2 shows a cross-section of the monitor of FIG. 1 ready for desorption of contaminants.

Referring to the drawings, the monitor comprises a holder body, 1, having a first sampling chamber, 2, and a second desorption chamber 3. In FIG. 1, the end of the second chamber is sealed by a swagelock fitting, 4, and a charge, 5, of 0.2 g of 250–500 $\mu m$ "Tenax G" polymeric adsorbent is retained by a fine metal mesh disc having 150 $\mu m$ apertures, 6. A further such disc, 7, is fitted at the open end of the chamber 2 on a removable nut, 8, to prevent ingress of particulate matter; if desired, a permeation membrane, suitably of PTFE, may be used instead of or in addition to disc 7.

In the desportion mode as shown in FIG. 2, the holder body is inverted, and the charge of adsorbent flows to fill the desorption chamber, 3. The swagelock fitting 4 is removed and replaced with a nut, 9, having a gas connection, 10 to permit a gas/contaminant mixture to be carried to a gas chromatograph (not shown). The nut 8 is replaced by a nut, 11, carrying a gas inlet, 12.

In use, the monitor is positioned, in a desired location, as shown in FIG. 1. The atmosphere contacts the relatively large surface area of adsorbent exposed at disc, 6 and organic vapour contaminants are adsorbed. At the end of the pre-selected exposure time, for example eight hours, a closed nut (not shown) is used to seal the open end of the monitor and the monitor can then be transported or stored for later analysis. For analysis, the configuration of FIG. 2 is used, and the narrow desorption chamber, 3, carrying the adsorbent, is fitted into a heating block, dry nitrogen passed through and the desorbed contaminants analysed on a gas chromatograph.

Initial tests have shown a pick-up of contaminant organic vapours of approximately 15 times that of a commercial passive monitor system. (Perkin Elmer Vapour Adsorption Tubes used in the passive mode). In addition to accurate monitoring of very dilute organics, it is envisaged that the same monitors can be used for much higher contamination levels, for example in the ppm range, at lower exposure times of the order of minutes.

We claim:

1. A passive monitor capable of accuracy in measuring $ppm \times 10^{-3}$ concentrations of organic vapours in an atmosphere, comprising a charge of adsorbent contained in an adsorbent holder, said adsorbent holder having a first sampling chamber and a second desorption chamber interconnected and arranged such that the charge of adsorbent may be positioned in the first chamber wherein it is exposed to the atmosphere and adsorbs any organic contaminants and at the end of a predetermined sampling time may be transferred without handling to the second chamber in which the adsorbent may be treated to desorb the organic contaminants so they are removed from the holder for analysis, the first chamber having a larger cross-sectional area than the second chamber.

2. A monitor as claimed in claim 1, wherein the adsorbent is a polymeric adsorbent.

3. A monitor as claimed in claim 1, wherein the first and second chambers are two cylinders, the first having a relatively large diameter to length ratio, and the second having a relatively low diameter to length ratio.

4. A monitor as claimed in claim 1, constructed so that inversion from one position to another is sufficient to cause the adsorbent to flow under gravity from one chamber to the other.

5. A monitor as claimed in claim 1, provided with connection means whereby a gas supply line may be connected and a connection means whereby gas carrying desorbed contaminant may flow out of the holder for analysis.

6. A method of monitoring organis contaminant vapours in an atmosphere comprising the use of an apparatus according to claim 1.

7. A method of passively monitoring concentrations of organic vapours in an atmosphere capable of accuracy in measuring $ppm \times 10^{-3}$ comprising exposing a charge of adsorbent to the atmosphere in a first sampling chamber for a specified period of time, wherein the first sampling chamber is interconnected to a second desorption chamber and wherein the first sampling chamber is open at one end to the atmosphere and the second desorption chamber is sealed at an end opposite the first sampling chamber with sealing means, transferring the adsorbent charge from the first sampling chamber to the second desorption chamber, removing the sealing means and replacing it with gas connection means connectable to analyzing means, connecting a gas inlet to an open end of the first sampling chamber, and desorbing contaminants adsorbed in the adsorbent charge by flowing gas through the gas inlet and out the gas connection means, wherein a gas-contaminant mixture is delivered to the analyzing means for analysis.

8. The method of claim 7 wherein the first sampling chamber and the second desorption chamber are coaxial to each other, the first sampling chamber being normally disposed beneath the second desorption chamber and having a greater surface area to length ratio than the second desorption chamber.

9. The method of claim 8 wherein the step of transferring comprises inverting the two chambers so that the second desorption chamber is disposed beneath the first sampling chamber, wherein the adsorbent charge transfers by gravity to the second desorption chamber.

10. The method of claim 7 further comprising heating the second desorption chamber during desorption.

* * * * *